INVENTORS
CARL J. CRANE
GEORGE V. HOLLOMAN
RAYMOND K. STOUT
ATTORNEYS

April 6, 1943.   C. J. CRANE ET AL   2,315,501
AUTOMATIC GLIDE AND/OR CLIMB CONTROL
Filed Jan. 6, 1941   3 Sheets-Sheet 3

INVENTORS
CARL J. CRANE
GEORGE V. HOLLOMAN
RAYMOND K. STOUT
BY
ATTORNEYS

Patented Apr. 6, 1943

2,315,501

UNITED STATES PATENT OFFICE 2,315,501

AUTOMATIC GLIDE AND/OR CLIMB CONTROL

Carl J. Crane, Shreveport, La., and George V. Holloman and Raymond K. Stout, Dayton, Ohio Application January 6, 1941, Serial No. 373,334

4 Claims. (Cl. 244—76)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to mechanism for controlling the rate of ascent or descent of an aircraft, so that the said rate of ascent or descent remains substantially constant at a preselected value. The invention more particularly relates to a sensitive control means associated with the well-known automatic pilot, such that the longitudinal control device of the automatic pilot is adjusted by a rate-of-change-of-altitude responsive means to maintain level flight, or to ascend, or descend, at a constant preselected rate. The device in accordance with the invention is particularly adapted to control the rate of descent of an aircraft during the course of an instrument landing, made in accordance with the well-known Army Air Corps blind landing system, or modifications thereof, in which the aircraft is directionally aligned with the axis of the landing runway by signals received from respective radio compass transmitting stations spaced along the axis of the runway; and in which the descent is made in one or more stages at a constant rate from a predetermined altitude until contact is made with the ground. In order to relieve the pilot of the necessity of manually controlling the attitude of the aircraft as well as the engine throttle, in order to descend in a power glide at a constant rate, the throttle is set for an engine speed giving the correct power output for the glide and the automatic pilot maintains the aircraft in the level flight condition and by means of the sensitive control device in accordance with the invention, the automatic pilot is caused to actuate the elevators of the aircraft to correct for any departure in the rate of descent from the preselected value.

In a known prior art device disclosed in United States Patent No. 2,091,306, granted to Bert G. Carlson, it has been proposed to control the ascent, descent, or level flight conditions of an aircraft, by an automatic pilot having associated therewith a rate-of-change-of-altitude reponsive means. In this device a rate of climb or descent responsive device, is operative to control a valve, which in turn controls the supply of air directed by nozzles on to each of a pair of oppositely rotating turbine wheels, each turbine being connected to operate a common shaft in opposite directions respectively. The shaft in turn is operative to introduce a control correction factor into the automatic pilot. As long as the torques on the turbines remain equal, no correction is introduced into the automatic pilot, but upon a departure of the aircraft from a preselected rate of ascent or descent, the rate-of-change-of-altitude responsive means causes the control valve to alter the supply of air to the respective turbine nozzles, to thereby cause a greater torque on one turbine than on the other, thus causing a rotation of the adjustment shaft in the direction of the greater torque acting thereon. The rotation of the adjustment shaft acts on the automatic pilot to cause the elevators to move up or down to restore the aircraft to the desired condition of flight.

The patented device in actual practice was however found to be entirely unsuited to accomplish the primary function of the present invention i. e. to accurately maintain the rate of climb or descent of an aircraft constant, at values of climb or descent respectively employed in take-off, or in instrument landing of the aircraft. The lack of sensitivity in the functioning of the patented device for the control of the aircraft rate of climb or descent, was found to be primarily due to two separate causes. The first cause being, that the pressure difference existing in a rate-of-climb meter available to operate the indicating elements thereof, never exceeds a value of approximately one inch of water and any friction or other load imposed on the pointer or indicating mechanism causes large errors in the rate of response end magnitude of indication of the instrument. To attempt to actuate a valve or other mechanical control element from the indicating mechanism of a rate-of-climb indicator destroys the possibility of obtaining a sensitive control due to the inertia and friction loads imposed on the indicating mechanism. The second defect was determined as being due to the fact, that a considerable excess of torque had to be developed by one of the turbine wheels in order to overcome the effects of inertia and friction in the adjustment mechanism, with the result that the adjustment when once initiated proceeded at a very high rate of speed causing overshooting of the control with consequent hunting.

In order to overcome the defects of the known prior art devices and provide a rate-of-change-of-altitude responsive control means operative to automatically maintain the rate of climb or descent of an aircraft substantially constant, or to maintain level flight at a preselected altitude the present invention provides an electrical servo means for introducing the control correction into the automatic pilot, the said electrical servo means being controlled by a photoelectric means. The photoelectric means is rendered operative by a beam, or beams of light, controlled by a rate-of-change-of-altitude responsive device, in accordance with the variation in the said rate-of-change-of-altitude from a predetermined value. By employing a photoelectric control means, no load is imposed on the rate-of-change-of-altitude responsive means and the responsive means is thus enabled to accurately respond to the rate-of-change-of-barometric pressure resulting from the ascent or descent of the aircraft and to exert a control in accordance therewith. To prevent hunting, the control device in accordance with the invention is provided with damping means, which prevents a too rapid application of the control and provides for a gradual diminution of the control effect, so that the control effect is substantially zero, when the aircraft is returned to the desired rate of ascent or descent.

The principal object of the invention is the provision in combination with an aircraft longitudinal control system, of power means for actuating said control system, of a control element operative to control the power means to vary the rate of ascent or descent of the associated aircraft, of photoelectrically controlled means for actuating said control element; and rate-of-change-of-altitude responsive means operative upon the variation in the rate-of-change-of-altitude from a preselected value for controlling the photoelectric means.

A further object of the invention is the provision in an automatic control system of the character described, of damping means cooperating with the control means to eliminate overcontrolling and hunting.

Other objects of the invention not specifically enumerated will become apparent by reference to the specification and the appended drawings in which.

Figure 1:
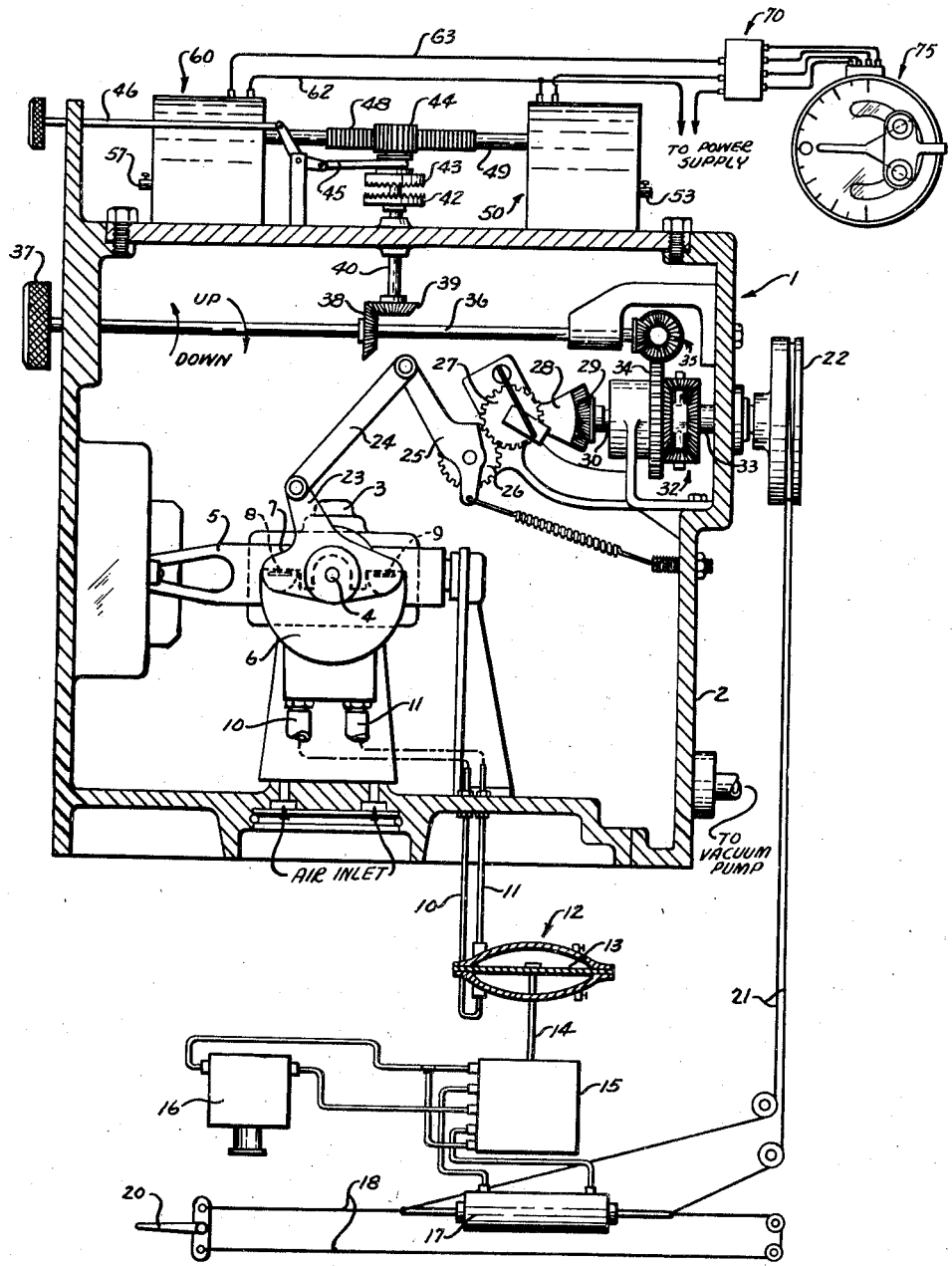
Figure 1 is an assembly view partly in section, illustrating the invention as applied to a conventional automatic pilot for controlling the ascent or descent of an aircraft.

Referring now to Figure 1, the reference numeral 1 generally indicates the longitudinal control unit of a conventional gyroscopically controlled automatic pilot, having a casing 2 adapted to be continuously evacuated by means of a pump, not shown. A conventional air driven gyro rotor indicated by the reference numeral 3 is mounted within the casing 2 and freely rotatable about the shaft 4 which is transversely journaled in a gimbal ring 5 which in turn is freely rotatable about a longitudinal axis. The rotor of the gyro is adapted to be driven by means of air jets in a well known manner, and when rotating at high speed the gyro rotor tends to remain horizontal irrespective of the instant attitude of the aircraft and the casing 2. The shaft 4 has mounted thereon a valve member 6 which is rotatable therewith and adapted to cooperate with a member 7 rotatable with the casing 2 and having valve ports 8 and 9 which cooperate with the valve edges of the valve member 6. Any pitching of the aircraft about a transverse axis will cause the casing 2 and member 7 to rotate relative to the valve member 6 which is maintained stationary by the gyroscope, and will thus cause an increase in the opening of one and a decrease in the opening of the other of the ports 8 and 9 which normally are partly and equally in communication with the reduced pressure within the casing 2. The ports 8 and 9 are connected by means of flexible conduits 10 and 11 to a double acting diaphragm type servomotor generally indicated by the reference numeral 12 having a diaphragm 13 thereof movable in opposite directions upon the increase or decrease of pressure in one of the conduits 10 and 11. The chambers formed on opposite sides of the diaphragm 13 are respectively connected to the conduits 10 and 11 and are also connected to the outside atmosphere through small restricted bleed ports. The action is such that if the port 8 is increased in open communication with the reduced pressure within the casing 2, a greater suction will be produced in the conduit 10 than in the conduit 11, so that the pressure above the diaphragm 13 will cause a downward movement of the diaphragm and of the valve rod 14 connected thereto. In a similar manner if the valve member 6 moves relative to the valve member 7 so that the opening of the port 9 is increased, the diaphragm 13 will move in an upward direction. The control rod 14 is adapted to actuate a pilot valve not shown, axially slidable within the valve housing 15 and adapted upon movement in either direction from a neutral position to admit fluid pressure from a pump 16 to a servomotor 17 which is connected by means of cables 18 to actuate the aircraft elevators 20. Any movement of the piston of the servomotor 17 is transmitted through the follow-up cables 21 to a rotatable drum 22 which is adapted to cause a follow-up movement of the valve member 7 with respect to the valve plate 6, as hereinafter more fully described. The valve member 7 is provided with an extension arm 23 which is pivotally connected by means of links 24 and 25 to be actuated by a gear 26 to cause rotary movement of the valve member 7 relative to the valve plate 6. The gear 30 meshes with a gear 27 which is adapted to be rotated by means of a bevel gear sector 28 and a bevel gear 29 from a shaft 30. The shaft 30 is connected to the planet wheel carrier of a conventional bevel gear differential generally indicated by the reference numeral 32. The shaft 30 through the differential 32 is adapted to be rotated by means of a shaft 33 connected to the follow-up cable drum 22, so that the valve member 7 is moved back towards its normal neutral position with respect to the valve member 6 as the servomotor 17 actuates the aircraft elevators. This follow-up action is necessary in order that the movement of the elevators be proportional to the angular deviation of the aircraft about a transverse axis so that when the aircraft is restored to the normal level flight position through the action of the elevators, the elevators will be in the neutral position. The shaft 30 which controls the movement of the valve member 7 as above explained may also be shifted in either direction independent of the follow-up shaft 33 by means of a gear 34 connected to the third leg of the differential 32, and rotatable by means of a worm not shown, which is actuated by the bevel gears 35 from a shaft 36. The shaft 36 is adapted to be manually rotated by means of a setting knob 37 so that the normal neutral position of the ports 8 and 9 of the valve member 7 relative to the valve member 6 may be shifted in either direction so as to cause the aircraft to ascend or descend at some given angle with respect to the gyro base line determined by the gyro unit 3. The usual arrangement of the gearing connecting the setting knob 37 and shaft 36 to the differential 32 is such that clockwise rotation of the setting knob causes the aircraft to descend while a counterclockwise rotation of the setting knob 37 causes the aircraft to ascend. With the setting knob 37 set in the level flight position, the gyro 3 through the valve members 6 and 7 is adapted to maintain the aircraft in the level flight position by correcting any deviation of the aircraft in a vertical plane from the level flight position by a contrary movement of the elevators 20, which thus restore the aircraft to its normal level flight position, and by rotation of the setting knob 37 in either direction, the aircraft may be caused to ascend or descend at a fixed angle of inclination with respect to the gyro base line, the gyro however being adapted to maintain the flight attitude of the aircraft along the axis of ascent or descent. The above described automatic means for controlling elevators of an aircraft is per se well known in the art and its specific construction forms no part of the present invention.

In an automatic pilot of the character above described there is no provision for controlling the rate of ascent or descent of the aircraft so long as the aircraft remains in the level flight position or ascends or descends along an axis determined by the setting knob 37, and the provision of a sensitive control of this character forms the novel feature of the invention, and is carried out by providing a bevel gear 38 on the manual setting shaft 36 which meshes with a corresponding bevel gear 39 secured on the lower end of a shaft 40 which is rotatably journaled in the casing 2. An automatic means for rotating the shaft 40 in the proper direction forms the means for maintaining the rate of ascent either substantially zero or at some preselected value. The shaft 40 has mounted thereon and rigidly secured thereto, a clutch element 42 which is adapted to be engaged by an axially slidable clutch element 43 which is slidably keyed to the shaft 40 and axially movable relative thereto. The clutch member 43 is rigidly connected to a gear 44 also splined or keyed to the shaft 40 but axially slidable thereon. The clutch 43 is adapted to be engaged or disengaged with the clutch member 42 by means of a shifter fork 45 actuated by a manual control rod 46, the purpose of the clutch being to connect or disconnect the automatic control at will. The gear 44 is in continuous meshing engagement with the teeth of a rack 48 formed as a part of the horizontal control rod 49 which is adapted to be shifted in opposite directions respectively by means of solenoids 50 and 60 which in turn are adapted to be energized through the medium of a power control relay 70 in turn operatively controlled by a rate-of-change-of-altitude responsive device generally indicated by the reference numeral 75. Upon engagement of the clutch elements 42 and 43 axial movement of the control rod 49 in either direction, will cause rotation of the shaft 40 and setting shaft 36, to introduce a correction into the automatic pilot to thereby cause the elevators 20 of the aircraft to be displaced in a direction such as to restore the rate of climb or descent of the aircraft to a preselected value.

Figure 2:
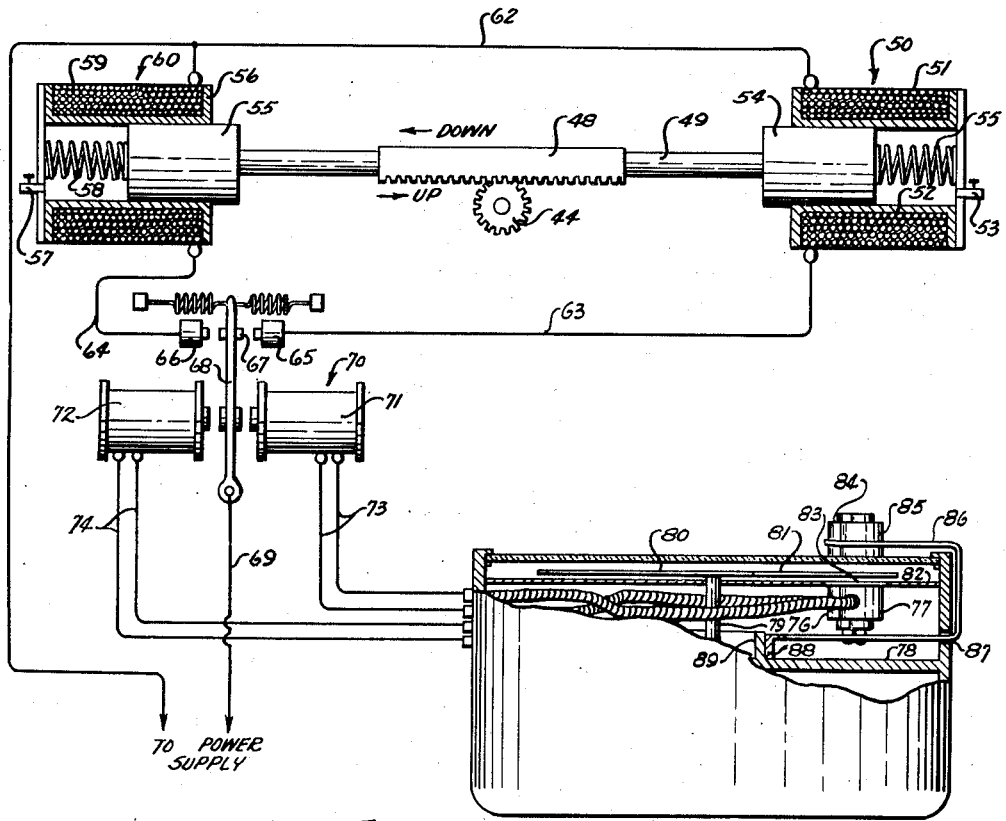
Figure 2 is a view partly in section, illustrating the novel photoelectric control device in accordance with the invention.

Referring now to Figure 2, it is seen that the solenoid 50 comprises a winding 51 arranged on an annular core member 52 which has its central bore closed at one end to form a cylinder communicating with the atmosphere through a restricted adjustable bleed port 53. A solenoid plunger member 54 made of magnetic material and formed as an enlarged head on one end of the control rod 49 extends within the cylinder formed by the core member 52 of the solenoid 50 and engages a compression spring 55 which yieldingly opposes inward movement of the plunger member 54 when the winding 51 is energized. The solenoid 60 is of similar construction to that of the solenoid 50 and comprises a plunger 55 formed on the other end of the control rod 59 and axially slidable within the cylinder formed by the annular core member 56, the cylinder being in restricted communication with the atmosphere through the adjustable bleed port 57, and inward movement of the plunger 55 being yieldingly opposed by compression spring 58. The solenoid winding 59 is arranged on the core member 56 in concentric relation with the plunger 55.

Figure 3:
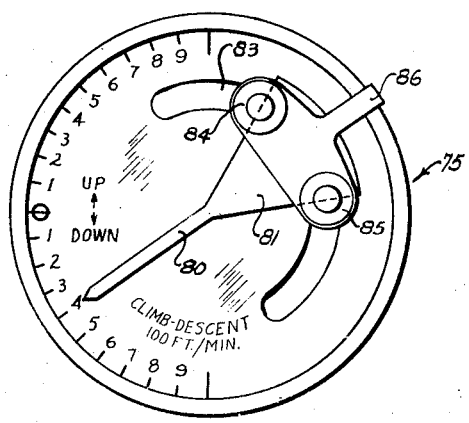
Figure 3 is a front elevation of the rate-of-change-of-altitude responsive means illustrated in Figure 2.

One of the terminals of each of the solenoid windings 51 and 59 is adapted to be connected by means of a conductor 62 to a suitable power supply not shown. The other terminal of the solenoid winding 51 is connected by means of a conductor 63 to a stationary contact 65 of a power control relay generally indicated by the reference numeral 70, and the other terminal of the solenoid winding 59 is similarly connected by means of the conductor 64 to a stationary contact 66 of the power supply relay 70. A double contact 67 mounted on a pivoted relay arm 68 is adapted to engage either of contacts 65 or 66 to connect the same to a power supply conductor 69. The relay arm 68 is normally maintained by means of springs in a neutral position such that the double contact 67 is out of engagement with either of the contacts 65 or 66, but is adapted upon either of the relay coils 71 or 72 being energized to be deflected from a neutral position to cause engagement between contact 67 and either of contacts 65 or 66 respectively. The relay coil 71 is adapted to be energized through conductors 73 by a photoelectric cell 77 of the Photronic type forming a part of a rate-of-change-of-barometric pressure responsive device 75, commonly known as a rate-of-climb indicator. The relay coil 72 is similarly connected by means of conductors 74 to a photoelectric cell 76 of the Photronic type also associated with the responsive means 75. The rate-of-change-of-barometric pressure responsive device 75, comprises the casing having a partition wall 78 which incloses a mechanism of a well known sensitive rate-of-climb indicator, having the indicator shaft 79 operative to move a pointer 80 relative to a dial 82, the pointer 80 having an arcuate sector or shield 81 secured thereto and rotatable therewith (see Figure 3). The dial 82 is provided with an arcuate transparent section 83 through which light from a respective pair of light sources 84 and 85 may pass therethrough. The light sources 84 and 85 are conventional electric lamps suitably supported in front of the instrument cover glass on a bracket 86 which has one leg thereon extending through an arcuate slot 87 in the instrument casing and secured to a sleeve 88 rotatably mounted on an enlarged head 89. The bracket 86 also serves as a supporting means for the photo sensitive cells 76 and 77 so that the cells are maintained in a position behind the dial 82 directly opposite the respective light sources 84 and 85. The bracket 86 is adapted to be rotatably positioned so that the light sources 84 and 85 are spaced at equal distances on opposite sides of a line intersecting the circumference of the dial 82 at a desired rate of climb or rate of descent indication, within certain predetermined limits. It will be seen by the inspection of Figure 3 that if the desired rate of descent be set, for example, at a value of 400 feet per minute that the shield 81 carried by the pointer 80 will intercept one-half of the quantity of light transmitted by the lamps 84 and 85 through the transparent sector 83 of the dial 82 to the respective photo cells 76 and 77 causing each of the cells to generate an equal current in the respective relay coils 71 and 72 so that the power relay armature 68 remains in its neutral position. If, however the aircraft should be descending at a rate greater than the preselected value of 400 feet per minute as seen in Figure 3, a greater quantity of light will be transmitted from the light source 85 to the photoelectric cell 77, than will be transmitted to the photoelectric cell 76 from the light source 84, causing the relay coil 71 to attract the relay arm 68 to cause engagement between the contacts 67 and 65 and thereby energizing the solenoid 50. The solenoid 50 will pull the plunger 54 axially to the right at a rate determined by the compression spring 55 and bleed port 53. Inward movement of the plunger 54 will cause the control rod 59 and rack 48 to rotate the gear 44 in a clockwise direction, as seen in Figure 2, which will cause rotation of the shaft 40 in a like sense and cause a corresponding counterclockwise rotation of the manual setting shaft 36 of the automatic pilot (Figure 1). This rotation of the setting shaft 36 will cause the elevators 20 of the aircraft to move up tending to reduce the rate of descent until the preselected value of 400 feet per minute is again obtained. If the aircraft should tend to descend at a rate less than the desired 400 feet per minute (Figure 3), the photo cell 76 will receive an increased amount of light from the light source 84 sufficient to cause the relay coil 72 to move the relay arm 68 in the opposite direction to cause engagement of contacts 66 and 67 thereby energizing the solenoid 60. Upon the solenoid 60 becoming energized, the control rod 49 will cause axial rotation of the shaft 40 and the manual setting shaft 36 of the automatic pilot (Figure 1) in the opposite direction from that above described, causing the elevators 20 of the aircraft to be deflected downward to increase the rate of descent until the preselected value is again reached.

It will be seen from the description of the operation of the novel photoelectric control system that any desired rate of ascent or descent including level flight may be maintained by setting the bracket 86 in the desired position, and that thereafter the rate-of-climb indicator will actuate the manual setting shaft 36 of the automatic pilot to maintain the desired flight condition. The provision of the dash pot cylinders in the solenoids 50 and 60 (Figure 2) tends to prevent a too rapid introduction of the correction factor into the automatic pilot due to the resistance offered to the discharge of air from the solenoid cylinders by the respective bleed ports 53 and 57 and permitting the correction to be introduced at a rate such that "hunting" will be avoided. The dash pots also cause the control effect to be canceled gradually rather than abruptly which further eliminates undesirable "hunting" effects.

In employing the structure disclosed in Figures 1 to 3 inclusive, for example, to maintain level flight, the pilot places the automatic control in operation by actuating the clutch control rod 46 to cause engagement of the clutch elements 42 and 43 and then sets the adjustable bracket 86 on the rate-of-climb indicator so that with the pointer in the zero position the shield 81 attached thereto will intercept equal quantities of light from the light sources 84 and 85. If then the aircraft should either ascend or descend even though the aircraft remains in the horizontal position, will cause the rate-of-climb indicator to indicate ascent or descent and apply a correction to the automatic pilot to overcome the tendency to ascend or descend. Since no load is imposed on the operating mechanism of the rate-of-climb indicator, a very sensitive response may be obtained, thus overcoming the difficulties encountered with prior art control structures of a similar nature. When it is desired to descend, for example, during the course of an instrument landing at a predetermined rate of descent, the pilot closes the engine throttle so that the aircraft enters a power glide with a rate of descent of approximately the desired amount. While still maintaining a level flight attitude, the pilot having previously set the adjustable bracket 86 of the rate-of-change-of-altitude device at the value corresponding to the desired rate of descent, for example, 400 feet per minute, the sensitive control means will then be operative to maintain this rate of descent substantially constant by minor adjustment of the aircraft elevators in either direction through the medium of the automatic pilot. It is thus not necessary for the pilot having once set the engine throttle in a predetermined position to further exert longitudinal control on the aircraft until a landing has been accomplished. The device of Figures 1 to 3 is similarly adapted to control the aircraft during take-off to maintain the rate of climb substantially constant at a preselected value.

Figure 4:
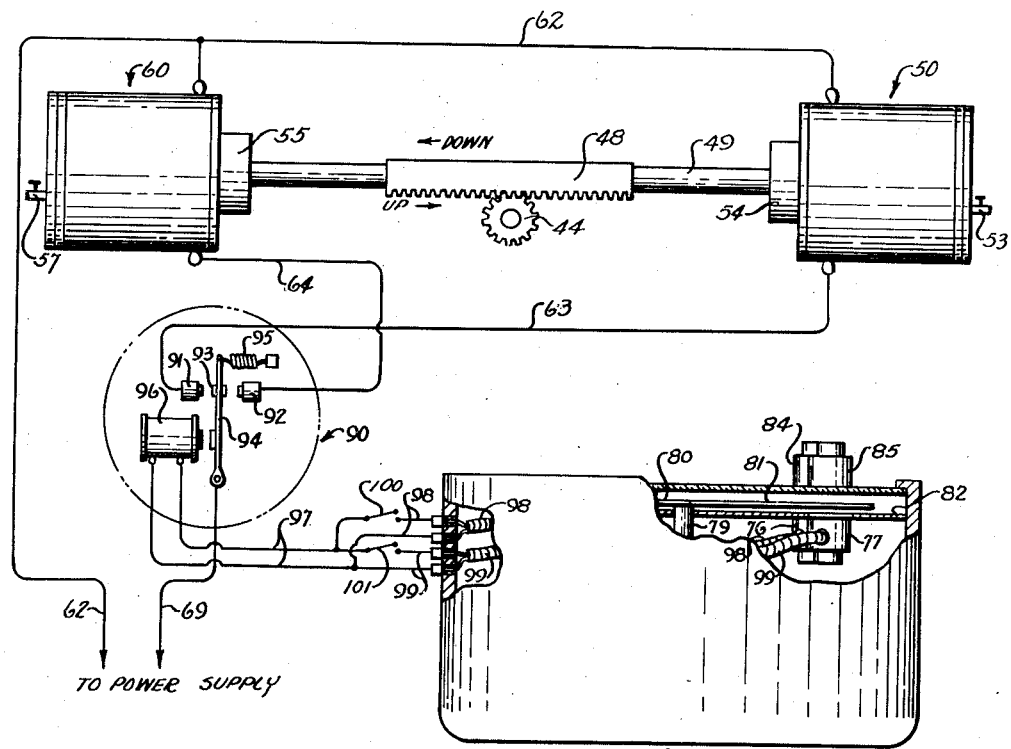
Figure 4 illustrates a modified form of the photoelectric control device illustrated in Figure 3.
Figure 5:
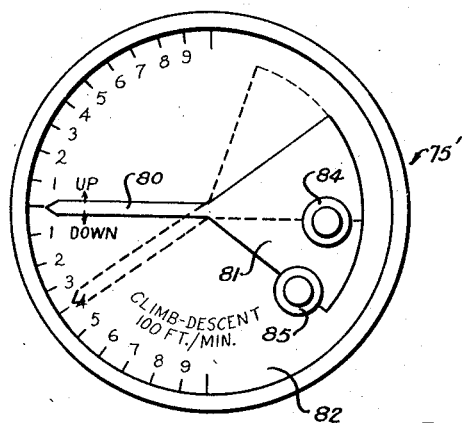
Figure 5 is a front elevation of the rate-of-change-of-altitude responsive means illustrated in Figure 4.

Figures 4 and 5 illustrate a modified form of photoelectric control which differs from the device illustrated in Figures 1 to 3 in that the photo electric cells are each operative to control the aircraft in a respective flight condition but are not jointly operative. In this modification, the photo cells 76 and 77 are mounted in a fixed relation behind the dial 82 of the rate-of-change-of-altitude responsive device 75', and the light sources 84 and 85 are similarly fixed in front of the instrument dial. The photoelectric cells 76 and 77 are adapted to receive light from the respective light sources 84 and 85 through suitable apertures cut in the dial 82, the light being intercepted by means of an arcuate shield 81 of the same character as the shield in the device illustrated in Figures 2 and 3. The power relay generally indicated by the reference numeral 90 has its contacts 91 and 92 respectively connected to the conductors 63 and 64 of the respective solenoids 50 and 60. The relay 90 is provided with a double contact 93 carried by a pivoted relay arm 94 and adapted to engage either of stationary contacts 91 or 92 respectively. The relay arm 94 is normally biased by a light tension spring 95 so that the contacts 92 and 93 are normally engaged. The relay 90 is also provided with a relay coil 96 which is adapted to be connected by means of conductors 97 parallel to respective pairs of conductors 98 and 99, the conductors 98 being connected to the photo cell 86 and conductors 99 being connected to the photo cell 77. Switches 100 and 101 permit either of the photo cells 76 or 77 to be electrically connected to the relay coil 96. Relay arm 94 of the relay 90 is connected to the power supply conductor 69, as in the device of Figures 1 to 3 inclusive.

In order to control the aircraft in the normal level flight condition to prevent an ascent or descent thereof, the photo cell 77 and light source 85 are placed in a position such that with the rate-of-climb indicator pointer 80 indicating zero rate of climb or descent, the edge of the shield 81 will intercept approximately one-half of the light transmitted from the light source 85 to the photo cell 77. If then the switch 101 be closed, the current passing from the photo cell 77 to the relay coil 96 will be sufficient to pull the relay arm 94 to a neutral position against the resistance of the spring 95 so that the contact 93 is out of engagement with either of the contacts 91 or 92. If then the aircraft should tend to descend, the shield 81 will move in a position admitting more light from the source 85 to the photoelectric cell 77, and causing a current to flow in the relay coil 96 sufficient to attract the relay arm 94 and cause engagement between the contacts 91 and 93. Engagement of the contacts 91 and 93 will energize the solenoid 50 causing the control rod 49 to be moved axially to the right and introducing a correction into the automatic pilot through the gear 44 in the same manner as in the device of Figure 1 to cause the aircraft elevators to be moved upward to compensate for the descent until the aircraft is again the normal level flight condition. If the aircraft should tend to ascend, the shield 81 attached to the pointer 80 will move to cut off the light passing from the light source 85 to the photoelectric cell 77 and reducing the current flow through the relay coil 96 an amount sufficient to allow the spring 95 to pull the relay arm 94 to the right causing engagement between the contacts 92 and 93 to thereby energize the solenoid 60 and to introduce a compensating correction into the automatic pilot in the same manner as in the device of Figures 1 to 3 inclusive.

In order to, for example, control the rate of descent of the aircraft during the course of an instrument landing, the light source 84 and photo cell 76 are so positioned, that the edge of the shield 81 intercepts approximately one-half of the light transmitted from the light source to the cell when the pointer 80 indicates the desired rate of descent, for example, 400 feet per minute (see Figure 5). The rate-of-climb indicator 75' is then operative to control the relay 90 to maintain a predetermined rate of descent in the same manner as above described with reference to the level flight condition. When it is desired to control the aircraft during descent, the switch 101 is opened and the switch 100 is closed so that the photoelectric cell 76 is operative to energize the relay coil 96 of the sensitive relay 90. In a similar fashion additional light sources and photo cells may be positioned in order to control other conditions of flight, for example, rate of climb during take-off, and operative through a suitable switch to control the relay 90.

While preferred forms of the invention have been illustrated and described, other modifications and variations thereof will become apparent to those skilled in the art as falling within the scope of the invention as defined by the appended claims.

We claim:

1. In an automatic pilot having a primary control means for normally maintaining an aircraft in level flight and a modifier for said primary control for causing the aircraft to ascend or descend; of means for automatically actuating said modifier in accordance with the variation in the rate of change of altitude from a predetermined value comprising, a reversible power means for actuating said modifier, a relay for selectively controlling the energizing of said reversible power means, and a control means for said relay including a source of light, a photoelectric control device adapted to respond to light received from said source and means responsive to rate of change of altitude for controlling the quantity of light transmitted from said source to said photoelectric control device upon a departure of the rate of change of altitude from a predetermined value.

2. The structure as claimed in claim 1, in which the means responsive to rate of change of altitude includes a pressure responsive means responsive to the rate of change of barometric pressure as the same changes with altitude, a rotatable shield interposed in the path of transmission of light from said light source to said photoelectric device and operative upon rotation thereof in either direction from a predetermined position to vary the quantity of said transmitted light, said shield being operatively connected to said pressure responsive means and rotated thereby from said predetermined position upon a variation in the rate of change of altitude from said predetermined value.

3. The structure as claimed in claim 1, in which the photoelectric device includes a pair of photoelectric cells adapted to receive light from said light source, and a rotatable shield interposed in the path of light from said light source to said cells and operable upon rotation thereof in either direction to differentially vary the amount of light transmitted to the respective photoelectric cells, said shield being operatively connected to the said means responsive to rate of change of altitude and rotatable thereby in accordance with the variation in said rate of change of altitude from a predetermined value.

4. The structure as claimed in claim 1, including adjustable means associated with said rate of change of altitude responsive means for preselecting the rate-of-change-of-altitude above and below which said responsive means becomes operable to cause selective actuation of said photoelectric device.

CARL J. CRANE.
GEORGE V. HOLLOMAN.
RAYMOND K. STOUT.